United States Patent Office.

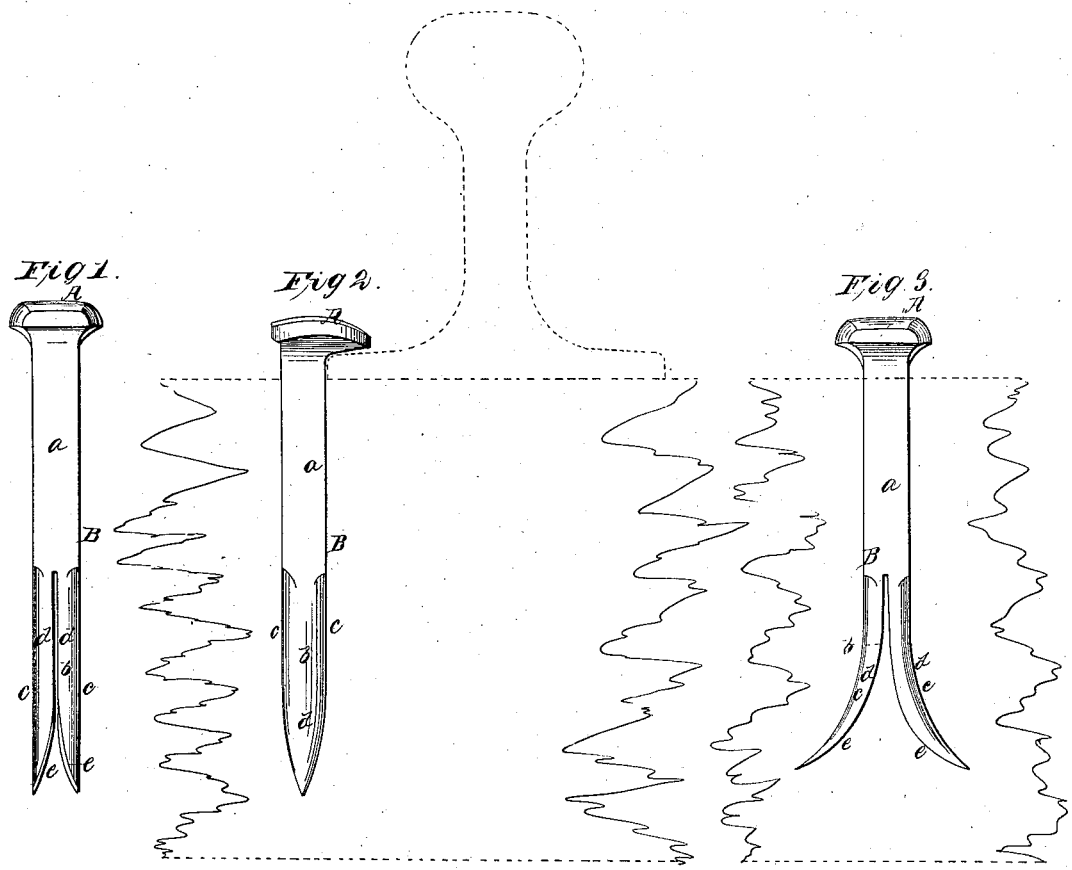

LOUIS POSTAWKA, OF BOSTON, MASSACHUSETTS, ASSIGNOR TO HIMSELF AND A. J. WONDRA, OF NEW YORK CITY.

Letters Patent No. 67,071, dated July 23, 1867.

IMPROVED RAILROAD SPIKE.

*The Schedule referred to in these Letters Patent and making part of the same.*

TO ALL WHOM IT MAY CONCERN:

Be it known that I, LOUIS POSTAWKA, of the city of Boston, in the county of Suffolk, and State of Massachusetts, have invented a new Improvement in Railroad Spikes; and I do hereby declare that the following is a full, clear, and exact description thereof, which will enable others skilled in the art to make and use the same, reference being had to the accompanying drawings forming a part of this specification.

This invention consists in constructing a spike with its upper half square or of quadrilateral form, and its lower half rounded and split longitudinally, from its point upward to said square part, the split or slitted portions being bevelled upon their inner edges or sides, and when driven into the wood separate or diverge in a line coincident with the axis of the spike. The upper square portion of the spike being made larger than the hole formed to fit the rounded lower portion, will more effectually bind and retain the spike in position. In the accompanying drawing—

Figure 1 is a side view of my invention before being driven into the tie or sleeper.

Figures 2 and 3, side views of the same, shown driven into the tie or sleeper.

Similar letters of reference indicate like parts.

A represents the head of the spike, which may be constructed in the usual manner, and B is the body or main portion, the upper portion $a$ of which is of square or quadrilateral form, the lower part $b$ having its corners rounded, as shown at $c$. The part $b$ extends upward not quite one-half the length of the body or main portion B, and said part $b$ is slitted its whole length, so as to form the prongs $d\ d$ of equal thickness; the inner sides of said prongs at their lower ends being bevelled, as shown at $e\ e$ in figs. 1 and 3. In using this spike a hole is bored into the tie or sleeper the size of the round portion of the spike, equal in depth to the length of the square portion $a$, the bottom edge of the hole forming shoulders upon which the lower bevelled inner sides $e\ e$ of the prongs $d\ d$ rest, and when driven into the unbored portion of the wood, the said shoulders divert, by their resistance, the prongs of the spike, causing them to diverge or separate in a line coincident with the axis of the spike, as shown in fig. 3, and form thereby an effectual clinch. It is evident that the square portion of the spike being driven into the hole of the same diameter as the round portion of the spike will bind and firmly secure it in the wood. The bevelled inner sides $e\ e$, at the lower ends of the prongs $d\ d$, perform an important function, as they cause the prongs $d\ d$ to spread, as under the force of the blows given the spike they commence to enter the unbored portion of the tie or sleeper.

This improvement will not augment materially the cost of the manufacture of the spike, while it will effectually prevent the casual withdrawal of the same.

Having thus described my invention, what I claim as new, and desire to secure by Letters Patent, is—

The spike B, its upper part square, and its lower round part $b$ split longitudinally, forming prongs $d\ d$, bevelled upon their inner sides, and separating when driven into the wood in a plane coincident with the axis of said spike as herein shown and described.

The above specification of my invention signed by me this 23d day of November, 1866.

LOUIS POSTAWKA.

Witnesses:
 WM. F. MCNAMARA,
 ALEX. F. ROBERTS.